United States Patent
Smith et al.

(10) Patent No.: US 9,291,154 B2
(45) Date of Patent: Mar. 22, 2016

(54) METHODS AND SYSTEMS FOR USE IN MONITORING A TACHOMETER

(75) Inventors: David Smith, Daleville, VA (US); Huimin Li, Roanoke, VA (US)

(73) Assignee: General Electric Company, Schenectady, NY (US)

(*) Notice: Subject to any disclaimer, the term of this patent is extended or adjusted under 35 U.S.C. 154(b) by 596 days.

(21) Appl. No.: 13/551,750

(22) Filed: Jul. 18, 2012

(65) Prior Publication Data

US 2014/0020444 A1  Jan. 23, 2014

(51) Int. Cl.
| | |
|---|---|
| *F03D 11/00* | (2006.01) |
| *G01P 21/00* | (2006.01) |
| *F03D 7/02* | (2006.01) |
| *G01P 21/02* | (2006.01) |
| *G01D 5/244* | (2006.01) |

(52) U.S. Cl.
CPC .............. *F03D 11/0091* (2013.01); *F03D 7/02* (2013.01); *G01D 5/24461* (2013.01); *G01P 21/00* (2013.01); *G01P 21/025* (2013.01); *F05B 2270/327* (2013.01); *Y02E 10/722* (2013.01); *Y02E 10/723* (2013.01)

(58) Field of Classification Search
CPC ...................................................... G01P 21/00
USPC .......................................................... 73/1.37
See application file for complete search history.

(56) References Cited

U.S. PATENT DOCUMENTS

| | | | |
|---|---|---|---|
| 3,626,247 A * | 12/1971 | Morse ............................ 361/239 |
| 4,216,419 A | 8/1980 | van Dam et al. | |
| 4,633,423 A * | 12/1986 | Bailey .............................. 702/96 |
| 5,155,375 A | 10/1992 | Holley | |
| 6,304,825 B1 | 10/2001 | Nowak et al. | |
| 7,400,993 B2 | 7/2008 | Shaver et al. | |
| 7,633,256 B2 | 12/2009 | Reichert et al. | |
| 7,709,784 B2 | 5/2010 | Thor et al. | |
| 7,977,623 B2 | 7/2011 | Thor et al. | |
| 2004/0041048 A1 * | 3/2004 | Karp et al. ................. 242/334.4 |
| 2009/0272885 A1 | 11/2009 | Thor et al. | |
| 2010/0072938 A1 | 3/2010 | Reichert et al. | |
| 2010/0314873 A1 * | 12/2010 | Stone .............................. 290/44 |
| 2012/0130678 A1 | 5/2012 | Ishioka et al. | |

FOREIGN PATENT DOCUMENTS

| | | |
|---|---|---|
| EP | 2620639 A1 | 7/2013 |
| WO | 2011099041 A1 | 8/2011 |

OTHER PUBLICATIONS

Search report issued in connection with EP Application No. 13176703.0, Oct. 25, 2013.

(Continued)

*Primary Examiner* — Paul West
(74) *Attorney, Agent, or Firm* — James McGinness, Esq.; Armstrong Teasdale LLP

(57) ABSTRACT

Methods and systems for use in monitoring a tachometer are provided. A method for use in correcting a signal from a tachometer coupled to a rotating shaft in a wind turbine includes receiving a raw tachometer signal from the tachometer coupled to a wind turbine shaft, the signal indicating the speed and/or angular position of the shaft, determining a cyclic error exists in the raw tachometer signal, and providing a corrective signal to adjust a torque within the wind turbine using the determined cyclic error.

13 Claims, 5 Drawing Sheets

(56) References Cited

OTHER PUBLICATIONS

"Incremental, Absolute and Analog Encoders" Catalogue, BEI-Ideacod SAS, Nov. 2005, retrieved from website http://www.bmb.co.th/download/BEI-Ideacod.pdf (132 pgs.).

"Shaft Encoders, Linear and Angular Measuring Systems 2001," Hengstler International, retrieved from webside http://www.long-control.com/download/encoder.PDF (250 pgs.).

"Industrial Encoders and Tachometers for Drive System Feedback, Instrumentation, and Control," Avtron Industrial Automation, 2015, retrieved from website http://www.nidec-avtron.com/encoders/documents/dynamicdocuments/encoderstachscat2015.pdf (28 pgs.).

"Encoders and Resolvers," Dynapar catalog, 2010, retrieved from website http://www.dynapar.com/uploadedFiles/_Site_Root/Service_and_Support/Dynapar2010Catalog.pdf (250 pgs.).

"Incremental Encoder and Absolute Encoder," catalog, 2015, Meyer Industrie-Electronic GmbH-Meyle, Germany, retrieved from website http://www.meyle.de/pdf/drehgeber-gesamtkatalog.pdf (116 pgs.).

"Rotary Encoders," Pepperl + Fuchs Sensors North American Catalog Edition 1.0, 2011, retrieved from website http://stevenengineering.com/Tech_Support/PDFs/32NATOTAL.pdf (pp. 913-1008).

* cited by examiner

METHODS AND SYSTEMS FOR USE IN MONITORING A TACHOMETER

BACKGROUND OF THE INVENTION

The subject matter described herein relates generally to wind turbines, and more specifically, to methods and apparatus for use in monitoring a tachometer in a wind turbine.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. A power output of a wind turbine generator increases with wind speed until the wind speed reaches a rated wind speed for the turbine. At and above the rated wind speed, the wind turbine generator operates at a rated power.

Variable speed operation of the wind turbine generator facilitates enhanced capture of energy by the wind turbine generator when compared to a constant speed operation of the wind turbine generator. However, variable speed operation of the wind turbine generator produces electricity having varying voltage and/or frequency. More specifically, the frequency of the electricity generated by the variable speed wind turbine generator is proportional to the speed of rotation of the rotor. A power converter may be coupled between the electric generator and an electrical grid. The power converter outputs electricity having a fixed voltage and frequency for delivery on the electrical grid. Additionally, the power converter relies on a tachometer for rotor position feedback and will impose torque disturbances on the turbine if there is an error in the tachometer signal.

BRIEF DESCRIPTION OF THE INVENTION

In one aspect, method for use in correcting a signal from a tachometer coupled to a rotating shaft in a wind turbine is provided. The method includes receiving a raw tachometer signal from the tachometer, the signal indicating the speed and/or angular position of the shaft, determining a cyclic error exists in the raw tachometer signal, and providing a corrective signal to adjust a torque within the wind turbine based at least in part on the determined cyclic error.

In another aspect, a method for detecting a variable misalignment coupling of a tachometer in a rotating machine is provided. The method includes determining a first rotor offset position value by comparing a first phase locked loop (PLL) signal to a first tachometer signal, determining a second rotor offset position value by comparing a second PLL signal to a second tachometer signal, and determining a loose coupling of the tachometer by comparing the first rotor offset position value to the second rotor offset position value.

In yet another aspect, a wind turbine system is provided. The wind turbine system includes a tachometer configured to provide a raw tachometer signal, the signal indicating a number of revolutions of a shaft of the wind turbine, and a power converter. The power converter is configured to determine a cyclic error exists in the raw tachometer signal and provide a corrective signal to adjust a torque within the wind turbine using the determined cyclic error.

DETAILED DESCRIPTION OF THE INVENTION

The methods and systems described herein facilitate monitoring a tachometer of a wind turbine. Using various determinations, including determining if a tachometer is misaligned and/or loose, the methods and systems described herein facilitate correcting incorrect tachometer signals to prevent the wind turbine from being damaged and ensure efficient operation of the wind turbine.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a purpose other than generating electrical power including, without limitation, pumping a fluid and/or grinding a substance. As used herein, the term "wind farm" is intended to be representative of a plurality of wind turbines that are grouped together.

Figure 1:
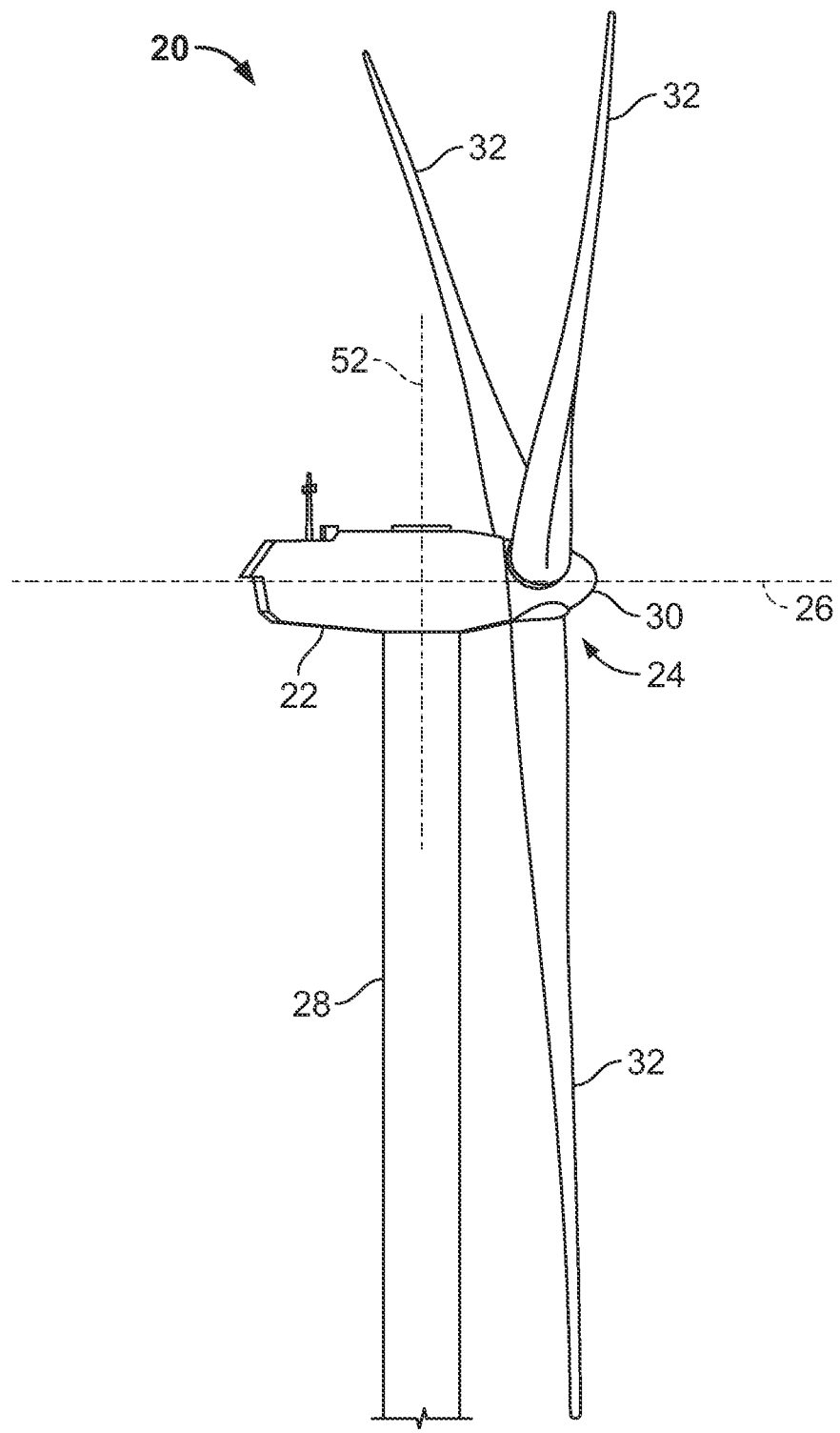
FIG. 1 is a perspective view of an exemplary wind turbine.
Figure 2:
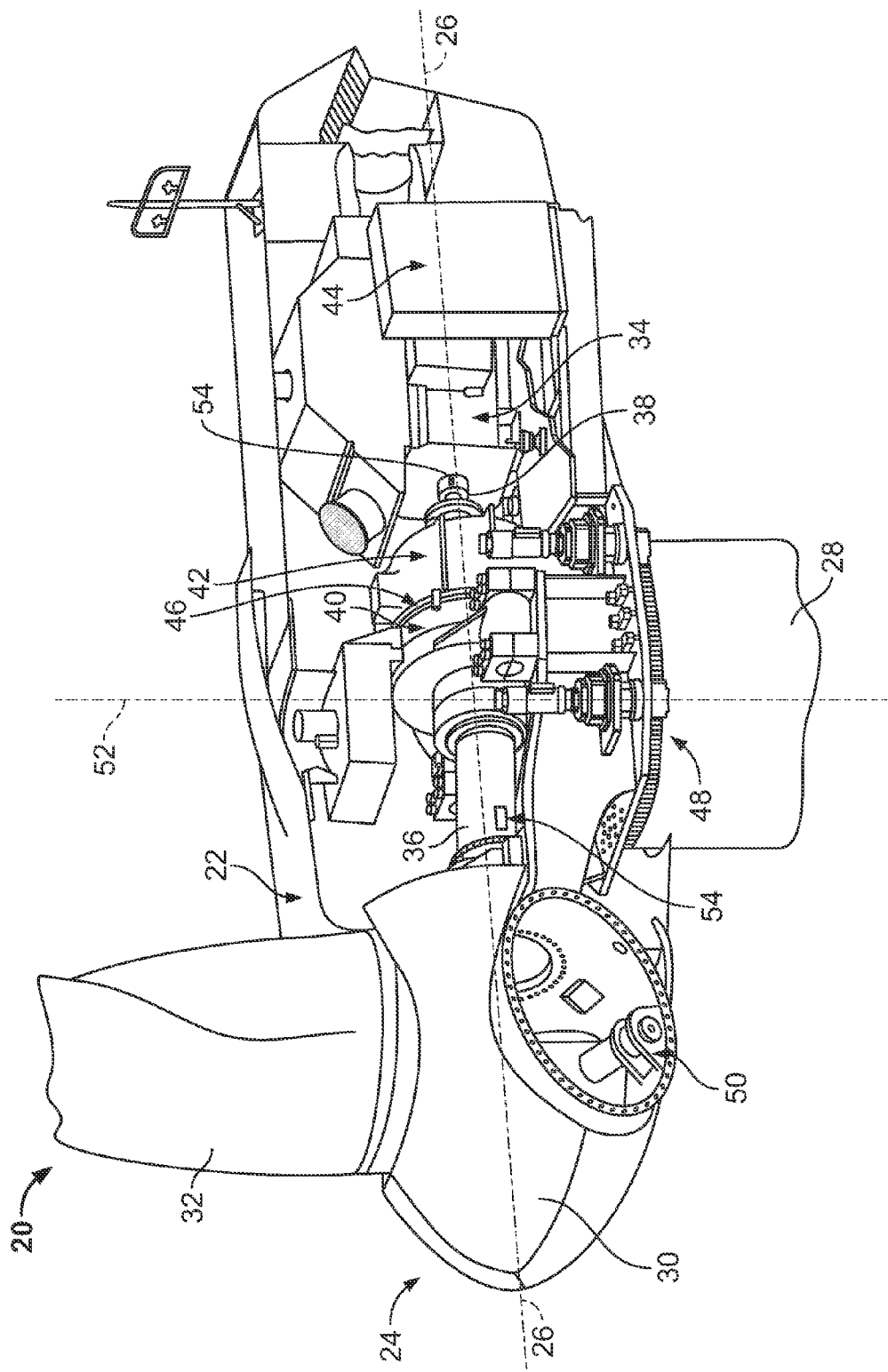
FIG. 2 is a perspective view of an exemplary nacelle suitable for use with the wind turbine shown in FIG. 1.

FIG. 1 is a perspective view of an exemplary wind turbine 20. FIG. 2 is a partially cut-away perspective view of a portion of wind turbine 20. Wind turbine 20 described and shown herein is a wind turbine generator for generating electrical power from wind energy. Moreover, wind turbine 20 described and illustrated herein includes a horizontal-axis configuration. However, in some embodiments, wind turbine 20 may include, in addition or alternative to the horizontal-axis configuration, a vertical-axis configuration (not shown). Wind turbine 20 may be coupled to an electrical load (not shown in FIG. 1), such as, but not limited to, a power grid, for receiving electrical power therefrom to drive operation of wind turbine 20 and/or its associated components and/or for supplying electrical power generated by wind turbine 20 thereto. Although only one wind turbine 20 is shown in FIGS. 1 and 2, in some embodiments, a plurality of wind turbines 20 may be grouped together, sometimes referred to as a "wind farm."

Wind turbine 20 includes a body or nacelle 22 and a rotor (generally designated by 24) coupled to nacelle 22 for rotation with respect to nacelle 22 about an axis of rotation 26. In the exemplary embodiment, nacelle 22 is mounted on a tower 28. However, in some embodiments, in addition or alternative to tower-mounted nacelle 22, nacelle 22 may be positioned adjacent the ground and/or a surface of water. The height of tower 28 may be any suitable height enabling wind turbine 20 to function as described herein. Rotor 24 includes a hub 30 and a plurality of blades 32 (sometimes referred to as "airfoils") extending radially outwardly from hub 30 for converting wind energy into rotational energy. Although rotor 24 is described and illustrated herein as having three blades 32, rotor 24 may have any number of blades 32. Blades 32 may each have any length that allows wind turbine 20 to function as described herein. For example, in some embodiments, one or more rotor blades 32 are about one-half meter long, while in some embodiments one or more rotor blades 32 are about fifty meters long. Other examples of blade 32 lengths include ten meters or less, about twenty meters, about thirty-seven meters, and about forty meters. Still other examples include rotor blades between about fifty and about one-hundred meters long, and rotor blades greater than one-hundred meters long.

Rotor 24 may have blades 32 of any shape, and may have blades 32 of any type and/or any configuration, whether such shape, type, and/or configuration is described and/or illustrated herein. One example of another type, shape, and/or configuration of blades 32 is a Darrieus wind turbine, sometimes referred to as an "eggbeater" turbine. Yet another example of another type, shape, and/or configuration of blades 32 is a Savonious wind turbine. Moreover, wind turbine 20 may, in some embodiments, be a wind turbine wherein rotor 24 generally faces upwind to harness wind energy, and/or may be a wind turbine wherein rotor 24 generally faces downwind to harness energy. Of course, in any of the embodiments, rotor 24 may not face exactly upwind and/or downwind, but may face generally at any angle (which may be variable) with respect to a direction of the wind to harness energy therefrom.

Figure 3:
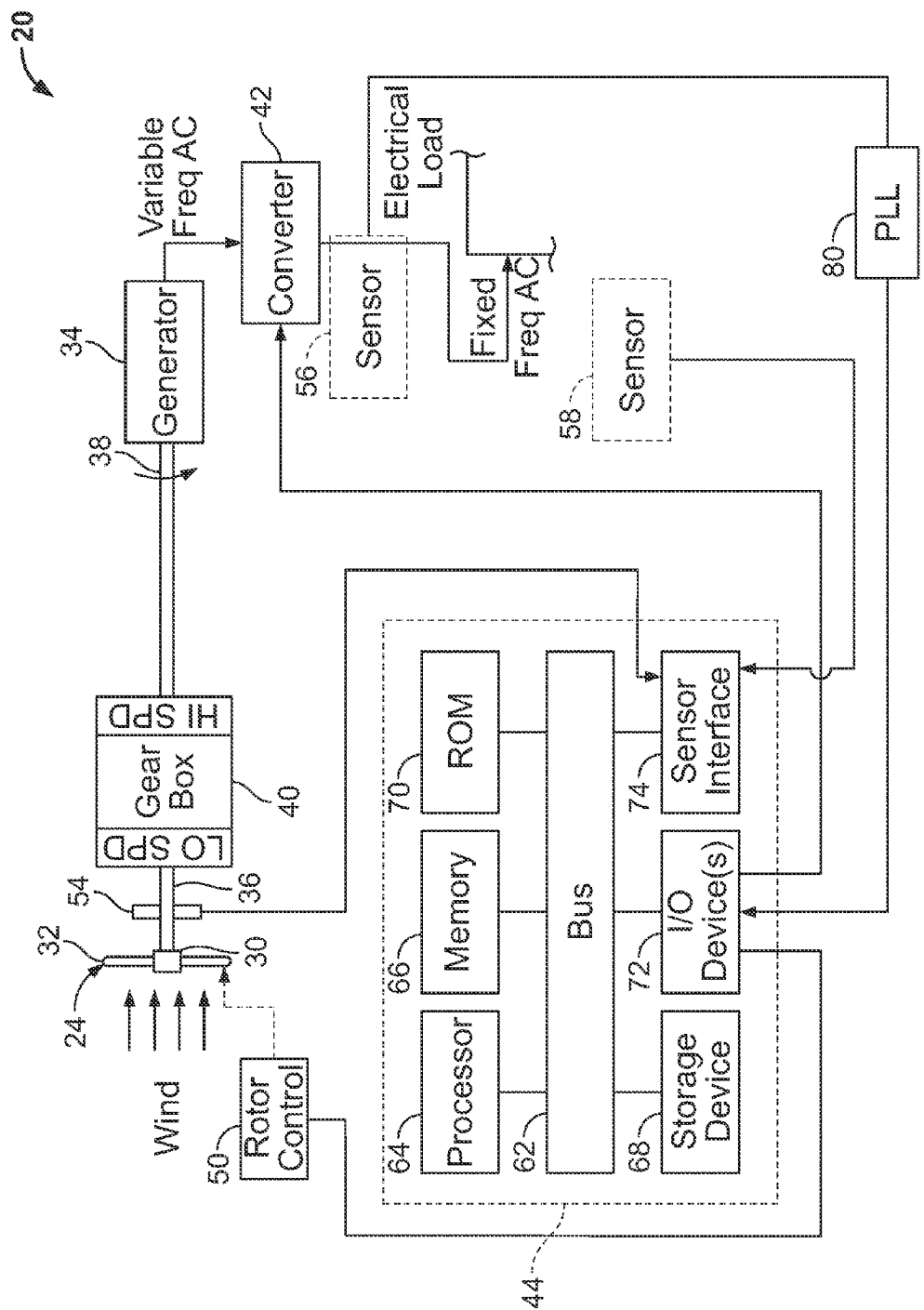
FIG. 3 is an electrical schematic diagram of the wind turbine shown in FIG. 1.

Referring now to FIGS. 2 and 3, wind turbine 20 includes an electrical generator 34 coupled to rotor 24 for generating electrical power from the rotational energy generated by rotor 24. Generator 34 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. Generator 34 includes a stator (not shown) and a rotor (not shown) with an air gap included therebetween. Rotor 24 includes a rotor shaft 36 coupled to rotor hub 30 for rotation therewith. Generator 34 is coupled to rotor shaft 36 such that rotation of rotor shaft 36 drives rotation of the generator rotor, and therefore operation of generator 34. In the exemplary embodiment, the generator rotor has a generator shaft 38 coupled thereto and coupled to rotor shaft 36 such that rotation of rotor shaft 36 drives rotation of the generator rotor. In other embodiments, the generator rotor is directly coupled to rotor shaft 36, sometimes referred to as a "direct-drive wind turbine." In the exemplary embodiment, generator shaft 38 is coupled to rotor shaft 36 through a gearbox 40, although in other embodiments generator shaft 38 is coupled directly to rotor shaft 36.

The torque of rotor 24 drives the generator rotor to thereby generate variable frequency AC electrical power from rotation of rotor 24. Generator 34 has an air gap torque between the generator rotor and stator that opposes the torque of rotor 24. A power conversion assembly 42 is coupled to generator 34 for converting the variable frequency AC to a fixed frequency AC for delivery to an electrical load (not shown in FIG. 3), such as, but not limited to an electrical grid (not shown in FIG. 3), coupled to generator 34. Power conversion assembly 42 may include a single frequency converter or a plurality of frequency converters configured to convert electricity generated by generator 34 to electricity suitable for delivery over the power grid. Power conversion assembly 42 may also be referred to herein as a power converter. Power conversion assembly 42 may be located anywhere within or remote to wind turbine 20. For example, power conversion assembly 42 may be located within a base (not shown) of tower 28.

In the exemplary embodiment, wind turbine 20 includes a tachometer 54 coupled to rotor shaft 36 for measuring a speed of rotation of rotor shaft 36 and/or a torque of rotor shaft 36. Tachometer 54 may be in any suitable location within or remote to wind turbine 20. In the exemplary embodiment, tachometer 54 is coupled in electronic data communication to system controller 44 for transmitting measurement signals to system controller 44 for processing and/or receiving suitable signals from system controller 44.

In the exemplary embodiment, wind turbine 20 includes at least one system controller 44 for generally controlling operation of wind turbine 20 and/or controlling operation of the components thereof. For example, system controller 44 may be configured to control operation of power conversion assembly 42, a disk brake 46, a yaw system 48, a variable blade pitch system 50, and/or tachometer 54. Disk brake 46 brakes rotation of rotor 24 to, for example, slow rotation of rotor 24, brake rotor 24 against full wind torque, and/or reduce the generation of electrical power from electrical generator 34. Yaw system 48 for rotating nacelle 22 about an axis of rotation 52 for changing a yaw of rotor 24, and more specifically for changing a direction faced by rotor 24 to, for example, adjust an angle between the direction faced by rotor 24 and a direction of wind.

In one embodiment, variable blade pitch system 50 controls a pitch angle of blades 32 (shown in FIGS. 1 and 2) with respect to a wind direction. Pitch system 50 may be coupled to system controller 44 such that system controller 44 may control pitch system 50. Pitch system 50 is coupled to hub 30 and blades 32 for changing the pitch angle of blades 32 by rotating blades 32 with respect to hub 30. The pitch actuators may include any suitable structure, configuration, arrangement, means, and/or components, whether described and/or shown herein, such as, but not limited to, electrical motors, hydraulic cylinders, springs, and/or servomechanisms. Moreover, the pitch actuators may be driven by any suitable means, whether described and/or shown herein, such as, but not limited to, hydraulic fluid, electrical power, electro-chemical power, and/or mechanical power, such as, but not limited to, spring force.

In an exemplary embodiment, wind turbine 20 includes a plurality of sensors, for example, sensors 56 and 58. Sensors 56 and 58 measure a variety of parameters including, without limitation, operating conditions and atmospheric conditions. Each sensor 56 and 58 may be an individual sensor or may include a plurality of sensors. Sensors 56 and 58 may be any suitable sensor having any suitable location within or remote to wind turbine 20 that allows wind turbine 20 to function as described herein. In the exemplary embodiment, sensor 56 is coupled to power conversion assembly 42 for measuring an electrical power output of power conversion assembly 42. In addition, sensor 56 is coupled in electronic data communication to system controller 44 for sending measurement signals to system controller 44 for processing and/or receiving suitable signals from system controller 44. Sensor 56 may be any suitable sensor including, without limitation, Hall effect current transducers (CTs) and/or capacitive voltage transducers (CVTs) having any suitable location within or remote to wind turbine 20.

In some embodiments, system controller 44 includes a bus 62 or other communications device to communicate information. One or more processor(s) 64 are coupled to bus 62 to process information, including information from sensors 54, 56, 58 and/or other sensor(s). Processor(s) 64 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

In one embodiment, system controller 44 includes one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64. Processor(s) 64 process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

System controller 44 may also include, or may be coupled to, input/output device(s) 72. Input/output device(s) 72 may include any device known in the art to provide input data to system controller 44 and/or to provide outputs, such as, but not limited to, yaw control and/or pitch control outputs. Instructions may be provided to RAM 66 from storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. It should be noted that execution of sequences of instructions is not limited to any specific combination of hardware circuitry and software instructions, whether described and/or shown herein. Also, in the exemplary embodiment, input/output device(s) 72 may include, without limitation, computer peripherals associated with an operator interface such as a mouse and a keyboard (neither shown in FIG. 3). Alternatively, other computer peripherals may also be used that include, for example, a scanner (not shown in FIG. 3). Furthermore, in the exemplary embodiment, additional output channels include, for example, an operator interface monitor (not shown in FIG. 3). In one embodiment, system controller 44 includes a sensor interface 74 that allows system controller 44 to communicate with sensors 54, 56, and 58 and/or other sensor(s). In one embodiment sensor interface 74 includes one or more analog-to-digital converters that convert analog signals into digital signals that is used by processor(s) 64.

Figure 4:
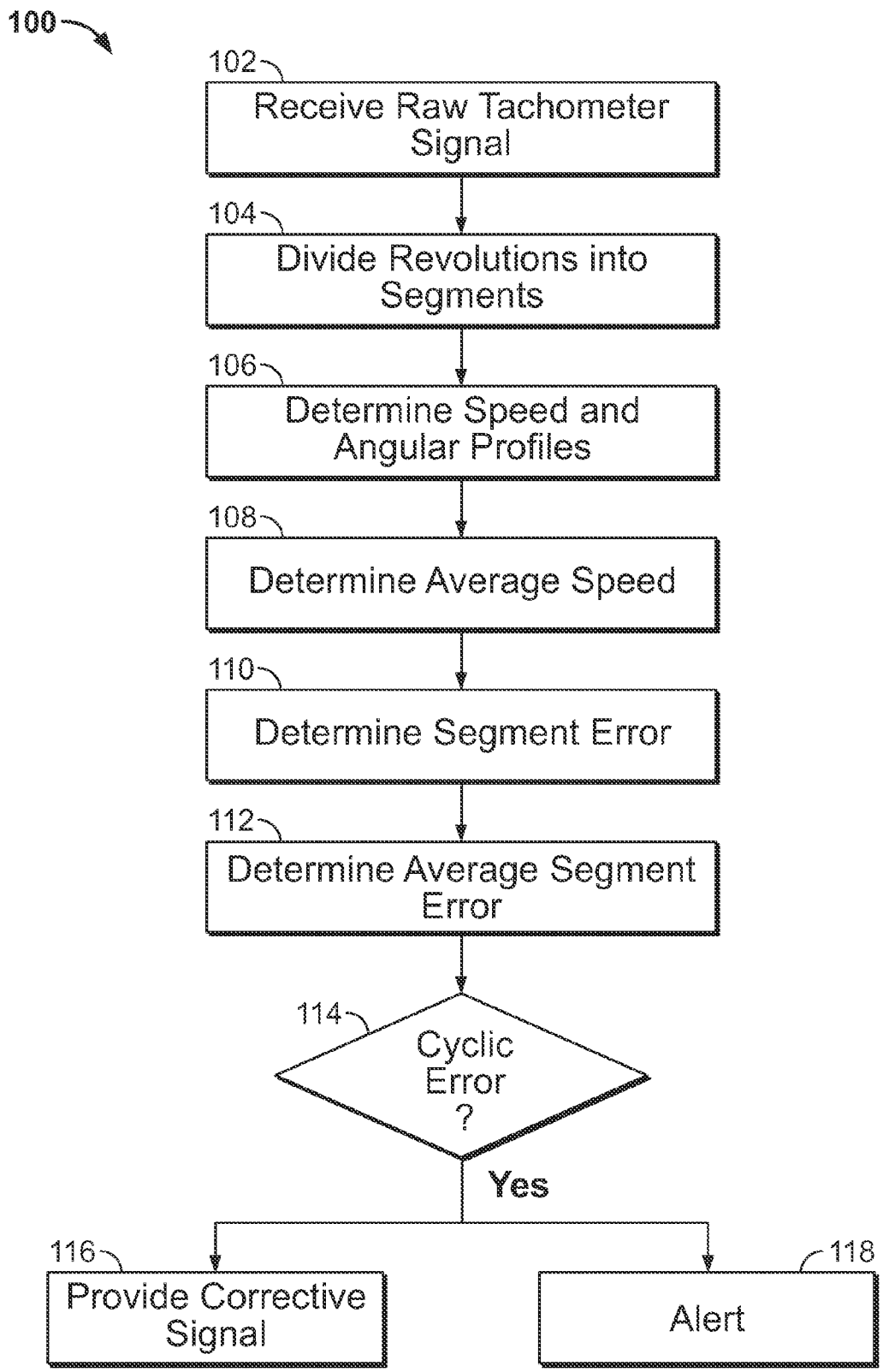
FIG. 4 is a flowchart illustrating an exemplary method for controlling the wind turbine shown in FIG. 1.

FIG. 4 is a flowchart illustrating an exemplary method 100 for controlling a wind turbine, such as wind turbine 20 shown in FIGS. 1, 2, and 3. In the exemplary embodiment, method 100 includes receiving 102 a raw tachometer signal from tachometer 54 coupled to shaft 36. In the exemplary embodiment, the raw signal is received 102 as pulses representing a number of revolutions. In one embodiment, 2048 pulses are transmitted in each revolution of shaft 36. Alternatively, 3072 pulses are transmitted in each revolution of shaft 36, however any number of pulses may be transmitted to indicate a revolution of shaft 36. The pulses received 102 enable turbine 20 to determine a speed and angular position of shaft 36. For example, to determine speed, a frequency of pulses is divided by time. In one embodiment, the raw signal is sent through a low pass filter before being received 102.

In the exemplary embodiment, each revolution in the raw signal is divided 104 into a predetermined number of segments. Each segment corresponds to an angular portion of shaft 36. For example, if the raw signal is divided 104 into 6 segments, segment 1 corresponds to 60° of shaft 36. In the exemplary embodiment, a speed profile and an angular position profile is determined 106. A speed profile is determined 106 by calculating a speed for each segment of each revolution. Likewise, an angular position profile is determined 106 by calculating an angular position for each segment of each revolution. In the exemplary embodiment, the determined 106 profiles include a history for each segment. In the exemplary embodiment, determined profiles 106 include each segment's history for a predetermined time (e.g., 2 seconds, 1 minute, 3 hours) or number of revolutions (e.g, 10 revolutions, 45 revolutions, 250 revolutions). Determined profiles 106 can include each segment's history for any amount of time, number of revolutions, or combination thereof. In the exemplary embodiment, after a speed profile is determined, an average speed for each revolution is determined 108. The average segment speed of each revolution is determined 108 by averaging all of the segment speeds for a revolution.

In the exemplary embodiment, a segment error is determined 110 by comparing a segment speed in a determined 106 speed profile to the average segment speed for the same revolution. Using the determined 110 segment error, an average segment error is determined 112. The average segment error is determined 112 by averaging the segment errors of a segment for a predetermined time (e.g., 2 seconds, 1 minute, 3 hours) or number of revolutions (e.g, 10 revolutions, 45 revolutions, 250 revolutions). Alternatively, the average segment error can be determined 112 for any amount of time, number of revolutions, or combination thereof.

In the exemplary embodiment, a determination 114 is made as to whether a cyclic error exists. A cyclic error is determined 114 by comparing the average segment error to a predetermined threshold. In the exemplary embodiment, a cyclic error is determined 114 when the average segment error exceeds 5%. Alternatively, a cyclic error can be determined 114 to exist using any value or any percentage that facilitates monitoring a tachometer as described herein. In an alternative embodiment, cyclic error is determined 114 to exist by comparing one average segment error to another average segment error. Additionally, in one embodiment, a cyclic error is determined 114 to exist by comparing an angular position for a segment in one revolution to an angular position for the segment in another revolution. If the difference of the angular positions exceeds a predetermined threshold (e.g., +/−2%, +/−5%) a cyclic error is determined 114 to exist. In the exemplary embodiment, a cyclic error corresponds to a misaligned tachometer on rotor 36.

In the exemplary embodiment, if a cyclic error is determined 114 to exist in turbine 20, a corrective signal is provided 116. In the exemplary embodiment, the determined 114 cyclic error is subtracted out of the received 102 raw signal to produce 116 the corrective signal. In one embodiment, the corrective signal is utilized to produce a relatively smooth torque of turbine 20 in spite of a misalignment. In one embodiment, if a cyclic error is determined to exceed an alarm threshold (e.g., 8%, 10%) an alarm is provided 118. In such an embodiment, turbine 20 can be tripped or disabled until cleared by maintenance personnel.

Figure 5:
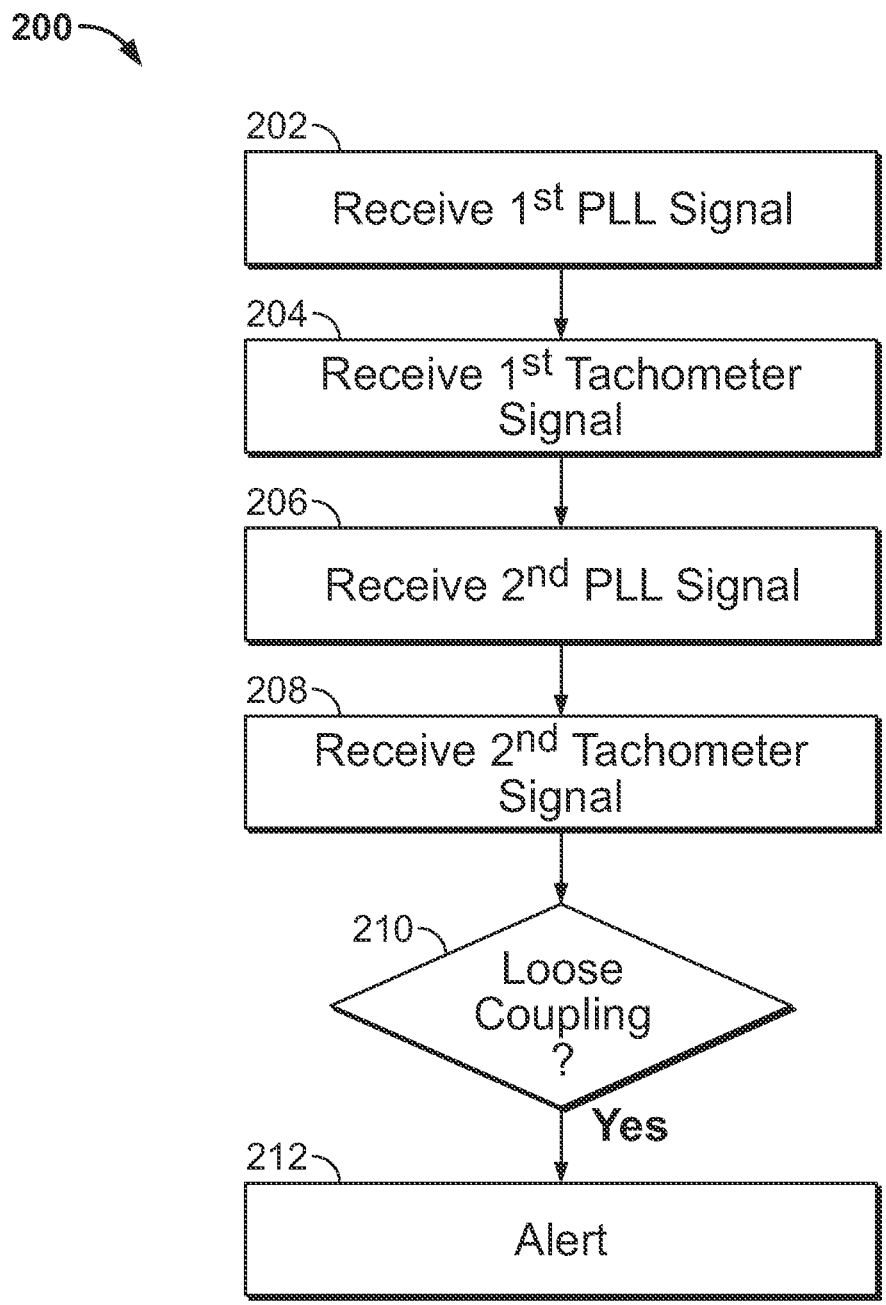
FIG. 5 is a flowchart illustrating another method for controlling the wind turbine shown in FIG. 1.

FIG. 5 is a flowchart illustrating another method 200 for controlling a wind turbine, such as wind turbine 20 shown in FIGS. 1, 2 and 3. In the exemplary embodiment, method 200 includes receiving 202 a first phase locked loop (PLL) signal from the stator of generator 34 before an occurrence an operational condition. In the exemplary embodiment, the operational condition is a turbine 20 start sequence. Alternatively, the operational condition can include any turbine condition that facilitates monitoring a tachometer as described herein. In the exemplary embodiment, the first PLL signal includes an angular position of rotor 36 of turbine 20. In the exemplary embodiment, a first tachometer signal is received 204 from tachometer 54 during the operational condition. Similar to the first PLL signal, the first tachometer signal includes an angular position of a rotor of turbine 20.

In the exemplary embodiment, after the operational condition has ceased, and before the operational condition occurs subsequently, a second PLL signal is received 206 from the stator of generator 34. The second PLL signal includes an angular position of rotor 36 of turbine 20. During the subsequent occurrence of the operational condition, a second tachometer signal is received 208 from tachometer 54 including an angular position of a rotor of turbine 20. In the exemplary embodiment, a determination 210 is made as to whether tachometer 54 coupling to shaft 36 has a variable misalignment. In the exemplary embodiment, the variable misalignment is a loose coupling. Determination 210 includes comparing the first PLL signal to the first tachometer signal to obtain a first rotor offset position value and comparing the second PLL signal to the second tachometer signal to obtain a second rotor offset position value. The first and second offset position values are then compared to determine an offset value difference. The offset value difference is then compared to a predetermined threshold (e.g., 3°, 5°) to determine 210 if tachometer 54 has a loose coupling. For example, if the first offset position value results in an 83% difference between the first PLL signal and the first tachometer signal, and the second offset position results in a 71% difference in the second PLL signal and the second tachometer signal, resulting in a 7° difference, tachometer 54 would be determined 210 to have a loose coupling. In the exemplary embodiment, when a loose coupling is determined, an alarm is provided 212. In such an embodiment, turbine 20 can be tripped or disabled until cleared by maintenance personnel.

In the exemplary embodiment, methods 100 and 200 are performed by power conversion system 42. However, any component within turbine 20 can be utilized to perform the methods described above, including but not limited to system controller 44.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Exemplary embodiments of a wind turbine and methods for monitoring a tachometer in a wind are described above in detail. The embodiments of a wind turbine and methods described herein enable a wind turbine to identify and diagnose a tachometer misalignment. The embodiments of a wind turbine and methods described herein enable a wind turbine to produce feedback free or speed and/or alignment errors. This feedback can be utilized to produce a smooth torque in the wind turbine in spite of the identified misalignment. Additionally, the embodiments of a wind turbine and methods described herein enable the wind turbine to diagnose and pinpoint a loose coupling of a tachometer. These diagnostics enable the wind turbine to operate in a more efficient manner and reduce the down time of the turbine as a result of poor performance.

The methods and wind turbine are not limited to the specific embodiments described herein, but rather, components of the wind turbine, and/or steps of the methods may be utilized independently and separately from other components and/or steps described herein. For example, the methods and systems described herein may have other industrial and/or consumer applications and are not limited to practice with wind turbines as described herein. Rather, the present invention can be implemented and utilized in connection with many other industries.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for use in correcting a signal from a tachometer coupled to a rotating shaft in a wind turbine, said method comprising:
    receiving a raw tachometer signal from the tachometer, the signal indicating the speed and/or angular position of the shaft, wherein the tachometer is configured to transmit at least 1000 pulses in each revolution of the shaft;
    dividing each revolution of the received raw signal into a predetermined number of segments, wherein each segment is associated with an angular portion of the shaft;
    determining a speed profile by tracking the received raw signal, the speed profile including a speed of each segment for each revolution;
    determining a cyclic error exists in the raw tachometer signal; and
    providing a corrective signal to adjust a torque within the wind turbine based at least in part on the determined cyclic error.

2. A method in accordance with claim 1, wherein determining a speed profile further comprises tracking the received raw signal for at least one of a predetermined period of time and a predetermined number of revolutions.

3. A method in accordance with claim 1, further comprising determining an average segment speed for each revolution.

4. A method in accordance with claim 3, further comprising determining a segment error by comparing a speed of a segment of a revolution to the average segment speed of the revolution.

5. A method in accordance with claim 4, further comprising determining an average segment error for each segment by averaging the segment errors of the segment for at least one of a predetermined period of time and a predetermined number of revolutions.

6. A method in accordance with claim 5, wherein determining a cyclic error exists comprises comparing the average segment error to a predetermined threshold.

7. A method in accordance with claim 5, wherein providing a corrective signal comprises subtracting the average segment error from the received raw signal.

8. A method in accordance with claim 1, further comprising determining an angular position profile by tracking the received raw signal, the angular position profile including an angular position of each segment for each revolution.

9. A method in accordance with claim 8, wherein determining a cyclic error exists comprises comparing an angular position of a segment of a first revolution to an angular position of the segment of a second revolution.

10. A wind turbine system comprising:
a tachometer configured to provide a raw tachometer signal, the signal indicating a number of revolutions of a shaft of the wind turbine, wherein the tachometer is further configured to transmit at least 1000 pulses in each revolution of the shaft; and
a power converter configured to:
   divide each revolution of the received raw signal into a predetermined number of segments, wherein each segment is associated with an angular portion of the shaft;
   determine a speed profile by tracking the received raw signal, the speed profile including a speed of each segment for each revolution for at least one of a predetermined period of time and a predetermined number of revolutions;
   determine a cyclic error exists in the raw tachometer signal; and
   provide a corrective signal to adjust a torque within the wind turbine using the determined cyclic error.

11. A wind turbine system in accordance with claim 10, wherein the power converter is further configured to
determine an average segment speed for each revolution for at least one of a predetermined period of time and a predetermined number of revolutions.

12. A wind turbine system in accordance with claim 11, wherein the power converter is further configured to:
determine a segment error by comparing a speed of a segment of a revolution to an average segment speed of the revolution;
determine an average segment error by averaging the segment errors of a segment for at least one of a predetermined period of time and a predetermined number of revolutions; and
compare the average segment error to a predetermined threshold.

13. A wind turbine system in accordance with claim 12, wherein the power converter is further configured to provide a corrective signal by subtracting the average segment error from the received raw signal.

* * * * *